US012787913B2

(12) United States Patent
Hiraki et al.

(10) Patent No.: US 12,787,913 B2
(45) Date of Patent: Nov. 10, 2026

(54) AUTONOMOUS-TRAVEL-TYPE LAWN MOWER

(71) Applicant: YAMABIKO CORPORATION, Tokyo (JP)

(72) Inventors: Hidenori Hiraki, Tokyo (JP); Kenji Nakano, Tokyo (JP); Yoichi Fuse, Tokyo (JP); Lionel Convent, Brabant Walloon Province (BE)

(73) Assignee: YAMABIKO CORPORATION, Tokyo (JP)

( * ) Notice: Subject to any disclaimer, the term of this patent is extended or adjusted under 35 U.S.C. 154(b) by 336 days.

(21) Appl. No.: 18/294,542

(22) PCT Filed: Aug. 25, 2021

(86) PCT No.: PCT/JP2021/031142
§ 371 (c)(1),
(2) Date: Feb. 2, 2024

(87) PCT Pub. No.: WO2023/026395
PCT Pub. Date: Mar. 2, 2023

(65) Prior Publication Data
US 2024/0341220 A1 Oct. 17, 2024

(51) Int. Cl.
*A01D 34/00* (2006.01)
*A01D 34/64* (2006.01)
(Continued)

(52) U.S. Cl.
CPC ........... *A01D 34/008* (2013.01); *A01D 34/64* (2013.01); *A01D 34/74* (2013.01); *A01D 34/86* (2013.01); *A01D 75/28* (2013.01)

(58) Field of Classification Search
CPC ...... A01D 34/008; A01D 34/64; A01D 34/74; A01D 34/86; A01D 34/82; A01D 34/736;
(Continued)

(56) References Cited

U.S. PATENT DOCUMENTS 4,141,200 A * 2/1979 Johnson ............... A01D 41/141
56/DIG. 15
2019/0357433 A1* 11/2019 Fuse .................... A01D 34/736
(Continued)

FOREIGN PATENT DOCUMENTS

JP H09327223 A 12/1997
JP 2001028923 A 2/2001
(Continued)

*Primary Examiner* — Robert E Pezzuto
(74) *Attorney, Agent, or Firm* — HAUPTMAN HAM, LLP

(57) ABSTRACT

Provided is an autonomous lawn mower including: a movable machine body being movable through unmanned driving with moving devices; at least one lawn mowing work unit mounted on the movable machine body; and a machine body cover that covers an upper surface and a peripheral surface of the movable machine body. The at least one lawn mowing work unit includes: a cutting blade; a prime mover configured to drive the cutting blade; at least one ground-contact member, which is located within an area (WB) between the moving devices in a front-and-rear direction, and is configured to prevent contact of the cutting blade with a ground surface; and an adjustment mechanism configured to allow the lawn mowing work unit to be moved upward and downward with respect to the movable machine body. The ground-contact member and the cutting blade are located inside the machine body cover.

2 Claims, 6 Drawing Sheets

(51) Int. Cl.

| | |
|---|---|
| ***A01D 34/74*** | (2006.01) |
| ***A01D 34/86*** | (2006.01) |
| ***A01D 75/28*** | (2006.01) |

(58) Field of Classification Search
CPC .... A01D 34/733; A01D 34/78; A01D 34/828; A01D 75/28
See application file for complete search history.

(56) References Cited

U.S. PATENT DOCUMENTS

| | | | | |
|---|---|---|---|---|
| 2021/0084811 | A1* | 3/2021 | Bernini | A01D 34/74 |
| 2022/0217904 | A1* | 7/2022 | Svensson | A01D 34/82 |
| 2022/0354050 | A1* | 11/2022 | Du | A01D 34/008 |

FOREIGN PATENT DOCUMENTS

| | | | |
|---|---|---|---|
| JP | 2017111771 | A | 6/2017 |
| JP | 2019149995 | A | 9/2019 |
| JP | 2019201574 | A | 11/2019 |

* cited by examiner

AUTONOMOUS-TRAVEL-TYPE LAWN MOWER

RELATED APPLICATIONS

The present application is a National Phase of International Application No. PCT/JP2021/031142 filed Aug. 25, 2021.

TECHNICAL FIELD

This disclosure relates to an autonomous lawn mower, which is also referred to as a robotic lawn mower.

BACKGROUND ART

As an unmanned self-driving robotic lawn mower, a robotic lawn mower described in Patent Literature 1 below has been known. This robotic lawn mower includes a movable machine body and lawn mowing work units, which are provided inside a casing being open on a bottom. The lawn mowing work units are disposed on a center part of the movable machine body, specifically, between front wheels and rear wheels, which are moving devices. The robotic lawn mower mows a lawn in a field to a predetermined consistent height with use of cutting blades of the lawn mowing work units while automatically performing unmanned driving using the wheels of the movable machine body through the field. The lawn mowing work units are mounted so that their height in an up-and-down direction is adjustable with respect to the movable machine body. Thus, a lawn mowing height can be appropriately set by adjusting the height of the lawn mowing work units in the up-and-down direction with respect to the movable machine body.

CITATION LIST

Patent Literature

[PTL 1] JP 2019-149995 A

SUMMARY OF INVENTION

Technical Problem

An unmanned self-driving robotic lawn mower does not always drive on a flat ground surface to perform lawn mowing work. It may be required that the unmanned self-driving robotic lawn mower perform lawn mowing work while driving on a ground surface with a slope or unevenness. Also in such a case, unmanned lawn mowing work is required to be automatically performed while dealing with the slope or the unevenness of the ground surface.

According to the related art described above, the lawn mowing work is performed on a lawn below the center part of the movable machine body. When a slope or unevenness of the ground surface is present under an area between the moving devices in a front-and-rear direction, problems are liable to arise in that, for example, a lawn mowing height is varied or the cutting blades strike the ground surface. When the cutting blades strike the ground surface, damage to the cutting blades or the lawn may be brought about. Thus, it is required that the lawn mowing work be performed on the slope or unevenness of the ground surface when the slope or unevenness is present below the area between the moving devices in the front-and-rear direction while maintaining a desired mowing height with reduced damage to the cutting blades of the lawn mowing work units and the lawn in the field.

Solution to Problem

This disclosure has been made in view of the circumstances described above, and has an object to provide an autonomous lawn mower (robotic lawn mower) that allows damage to a cutting blade of a lawn mowing work unit and a lawn in a field to be reduced while maintaining a desired mowing height even when a slope or unevenness of a ground surface is present below an area between moving devices in a front-and-rear direction.

According to this disclosure, there is provided an autonomous lawn mower, including: a movable machine body being movable through unmanned driving with moving devices; at least one lawn mowing work unit mounted on the movable machine body; and a machine body cover that covers an upper surface and a peripheral surface of the movable machine body. The at least one lawn mowing work unit includes: a cutting blade; a prime mover configured to drive the cutting blade; at least one ground-contact member, which is located within an area between the moving devices in a front-and-rear direction, and is configured to prevent contact of the cutting blade with a ground surface; and an adjustment mechanism configured to allow the lawn mowing work unit to be moved upward and downward with respect to the movable machine body. The ground-contact member and the cutting blade are located inside the machine body cover.

According to this disclosure, lawn mowing is performed with the cutting blade of the lawn mowing work unit while the movable machine body is moving through unmanned driving. When the ground-contact member is brought into contact with the ground surface, the cutting blade is held at a desired height above a ground surface. The ground-contact member is located within the area between the moving devices in the front-and-rear direction. Thus, even when a slope or unevenness of the ground surface is present below the area between the moving devices in the front-and-rear direction, the desired mowing height is maintained while the ground-contact member is adapting to the slope or the unevenness. Thus, damage to the cutting blade of the lawn mowing work unit or a lawn in a field can be reduced. The ground-contact member and the cutting blade are located inside the movable body cover. Thus, the ground-contact member and the cutting blade are protected by the machine body cover from foreign matter such as a branch on the ground surface or a branch extending laterally from, for example, a hedge.

As one embodiment of this disclosure, the at least one ground-contact member may be arranged on a front side of the at least one lawn mowing work unit in a traveling direction of the movable machine body. In this manner, the ground-contact member provided on the front side of the lawn mowing work unit can adapt to the slope or the unevenness of the ground surface on the front side in the traveling direction to allow a height (mowing height) of the lawn mowing work unit to be maintained at a desired height and to prevent the cutting blade from striking the ground surface.

As one embodiment of this disclosure, the at least one lawn mowing work unit may include a plurality of lawn mowing work units, each of the plurality of lawn mowing work units may include the ground-contact member and the adjustment mechanism, and each of the lawn mowing work units may be movable upward and downward through intermediation of the adjustment mechanism independently of both of the movable machine body and other lawn mowing work units. In this case, every lawn mowing work unit can adapt to the unevenness of the ground surface based on, as a reference, a height at which the ground-contact member of the lawn mowing work unit is in contact with the ground surface. Thus, the collision between the cutting blade and the ground surface can be automatically prevented in an unmanned manner while the height of each individual lawn mowing work unit is maintained.

As one embodiment of this disclosure, the ground-contact members of the plurality of lawn mowing work units may be located within the area between the moving devices in the front-and-rear direction. In this manner, each of the lawn mowing work units can independently deal with the unevenness of the ground surface, which is present in an area smaller than the area between the moving devices in the front-and-rear direction and thus cannot be dealt with only by the moving devices. Thus, more accurate lawn mowing work can be performed.

As one embodiment of this disclosure, the ground-contact member may be disposed at a position offset from a central line of a work range of the cutting blade in a front-and-rear direction in the lawn mowing work unit. In this case, the ground-contact member can be arranged so as to be offset from the central line extending in the front-and-rear direction of the work range of the cutting blade, where visual quality may be particularly affected. Thus, the ground-contact member is less liable to become an obstacle to the lawn mowing work to thereby achieve mowing for a finely finished lawn.

As one embodiment of this disclosure, the ground-contact members may be disposed on both of a right side and a left side in front of a work range of the cutting blade. In this manner, even when the ground surface has unevenness on any one of the right side and the left side in front of the cutting blade, a mowing height can be maintained at a preset mowing height. Thus, even when the ground surface has a bump, the collision between the cutting blade and the ground surface can be prevented.

As one embodiment of this disclosure, when the adjustment mechanism is in at least one of a plurality of modes for adjusting a mowing height, the ground-contact member may be constantly in contact with the ground surface. According to this embodiment, the ground-contact member is constantly in contact with the ground surface while adjusting its height in accordance with the mowing height. Thus, the ground-contact member is held in contact with the ground surface to thereby enable stable lawn mowing work.

As one embodiment of this disclosure, at least one of the plurality of modes of the adjustment mechanism may be a low lawn mowing work mode. The risk of the contact between the cutting blade and the ground surface becomes highest when the adjustment mechanism is in the low lawn mowing work mode. Thus, when the adjustment mechanism is in the low lawn mowing work mode, the ground-contact member is constantly held in contact with the ground surface. As a result, the contact between the cutting blade and the ground surface can be prevented. Further, the cutting blade is held at the desired height while the lawn mowing work unit is adapting to the unevenness of the ground surface. Thus, the lawn mowing work can be carried out without damaging the cutting blade or a lawn.

As one embodiment of this disclosure, the ground-contact member may be brought into rolling contact with the ground surface. In this manner, friction between the ground-contact member and the ground surface is reduced. Thus, the ground-contact member is less liable to obstruct a thrust force for the movable machine body. Hence, a load on a prime mover for the moving devices during traveling can be reduced.

As one embodiment of this disclosure, the ground-contact member may be brought into sliding contact with the ground surface. This embodiment is dominant over a rolling-type ground-contact member. Specifically, when the ground-contact member is of rolling type, grass may be caught by a bearing portion that allows rolling, resulting in inhibition of smooth rolling of the ground-contact member. In contrast, the sliding contact-type ground-contact member does not cause the problem described above.

As one embodiment of this disclosure, the ground-contact member may be a plate body facing the ground surface and may be brought into contact with the ground surface at a protruding portion that protrudes downward from an outer peripheral portion of the plate body. In this manner, the ground-contact member is more compact and is formed in a simple manner. Thus, the ground-contact member not only contributes to reduction in cost but also suppresses tangling of grass around the ground-contact member.

As one embodiment of this disclosure, the protruding portion may be formed in an annular manner on a lower surface of the plate body. In this manner, the ground-contact member can adapt to unevenness in any direction.

As one embodiment of this disclosure, the ground-contact member may be mounted to a housing configured to support the prime mover. In this manner, the ground-contact member can be fixedly mounted at a desired unrotatable position in proximity to the lawn mowing work unit. Thus, the ground-contact member can adapt to the unevenness of the ground surface with high accuracy. Advantages of this configuration include a high degree of freedom in design of a mounting structure and no additional load on a prime mover for driving the cutting blade.

As one embodiment of this disclosure, the movable machine body may include a controller, and after the controller acquires information regarding unevenness of the ground surface, the controller may reduce a speed of the movable machine body. In general, the ground-contact member has higher adaptability to the unevenness of the ground surface when the movable machine body moves at a lower speed than when the movable machine body moves at a higher speed. For example, when the movable machine body is driven to move at a high moving speed on the ground surface having unevenness, the movable machine body may skip and the lawn mowing work unit may be separated from the ground surface, making it difficult to achieve a desired mowing height. In such a case, similarly to the lawn mowing work unit, the ground-contact member is separated from the ground surface. Thus, the adaptability to the ground surface is lowered. In contrast, according to this embodiment, after acquiring the information regarding the unevenness of the ground surface, the controller decreases the moving speed of the movable machine body. Thus, the adaptability of the ground-contact member to the unevenness of the ground surface is improved to thereby enable maintaining the mowing height at the desired height.

BRIEF DESCRIPTION OF DRAWINGS

FIG. 8 are explanatory views of an adjustment mechanism (vertical movement mechanism for the lawn mowing work unit) of the lawn mower of FIG. 2, in which

DESCRIPTION OF EMBODIMENTS

Now, with reference to the accompanying drawings, an embodiment of this disclosure is described.

Figure 1:
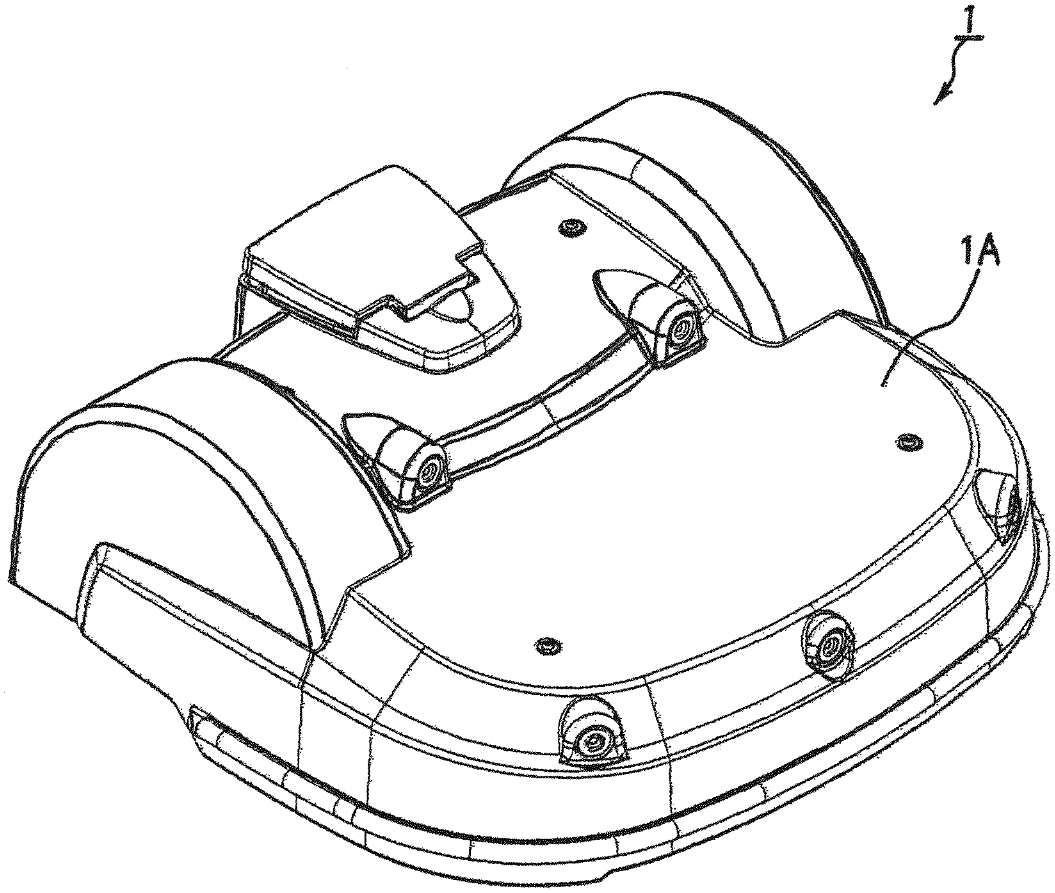
FIG. 1 is an overall perspective view of an autonomous lawn mower (robotic lawn mower) according to one embodiment of this disclosure.

An autonomous lawn mower 1 illustrated in FIG. 1 according to one embodiment of this disclosure is also referred to as a robotic lawn mower. The autonomous lawn mower 1 mows a lawn in a field to a predetermined consistent height while performing unmanned self-driving through the field. The lawn mower 1 of FIG. 1 includes a machine body cover 1A being open on a bottom. A movable machine body 2 and at least one lawn mowing work unit 3, which are described later, are disposed inside the machine body cover 1A. The machine body cover 1A covers an upper surface and a peripheral surface of the movable machine body 2. The machine body cover 1A prevents contact of obstacles such as a branch on a lawn or a branch extending laterally from, for example, a neighboring hedge with the movable machine body 2 or the lawn mowing work unit 3.

Figure 2:
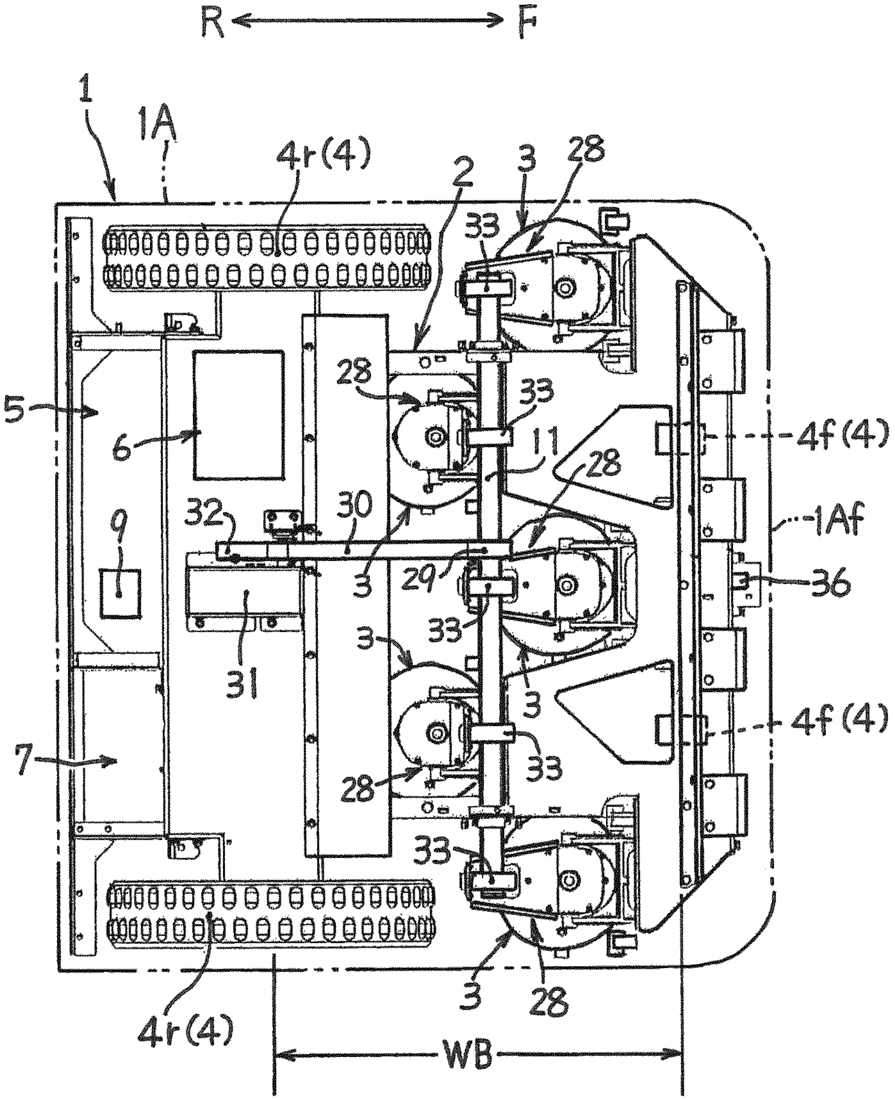
FIG. 2 is a plan view of the lawn mower of FIG. 1 with a machine body cover removed.

FIG. 2 is a plan view of the lawn mower 1 of FIG. 1 with the machine body cover 1A removed, in which an internal structure of the lawn mower 1 is illustrated. A right side in FIG. 2 corresponds to a front side F in a traveling direction of the movable machine body 2, and a left side in FIG. 2 corresponds to a rear side R in the traveling direction of the movable machine body 2. The lawn mower 1 includes the movable machine body 2 and at least one lawn mowing work unit 3. The movable machine body 2 has front wheels 4*f* and rear wheels 4*r*, which correspond to moving devices 4, and is movable through unmanned driving. The lawn mowing work unit 3 is mounted on the movable machine body 2. The movable machine body 2 includes a machine body frame 5. For example, a pair of right and left driving wheels 4*r*, 4*r* corresponding to the rear wheels, an electric drive motor 6, a rechargeable battery 7, a pair of right and left steered wheels 4*f*, 4*f* corresponding to the front wheels, and a steering adjustment section 8 (see FIG. 3) are mounted on the machine body frame 5. The drive motor 6 serves as a drive source for the driving wheels 4*r*, 4*r*. The rechargeable battery 7 serves as a power source for the drive motor 6. The steering adjustment section 8 controls the steered wheels 4*f*, 4*f*. Any of a set of the front wheels 4*f* and a set of the rear wheels 4*r* may be determined to be the driving wheels, and another one of the sets may be determined to be the steered wheels. Further, only one wheel may be provided as any of the front wheels 4*f* or the rear wheels 4*r*. The drive motor 6 and the steering adjustment section 8 are automatically controlled by a controller 9 including a microcomputer. In place of the moving devices 4 corresponding to the front wheels 4*f* and the rear wheels 4*r*, a crawler-type moving device including a pair of right and left track belts may be used.

In an example illustrated in FIG. 2, five lawn mowing work units 3 are mounted on the movable machine body 2. The number of lawn mowing work units 3 to be disposed and positions at which the lawn mowing work units 3 are disposed can be appropriately set. As one example thereof, three lawn mowing work units 3 on the front side are disposed at equal intervals within a width of the movable machine body 2 in a right-and-left direction and two lawn mowing work units 3 on the rear side are disposed behind the three lawn mowing work units 3 in the illustrated example. The lawn mowing work units 3 on the rear side are disposed just behind spaces between the lawn mowing work units 3 on the front side. All the lawn mowing work units 3 are arranged inside the machine body cover 1A so as to be located within an area with a wheel base WB (distance between the front wheels and the rear wheels) of the movable machine body 2. When the moving device 4 is a crawler-type one, the lawn mowing work units 3 are arranged inside the machine body cover 1A so as to be located within an area having a length of right and left track belts in the front-and-rear direction.

Figure 3:
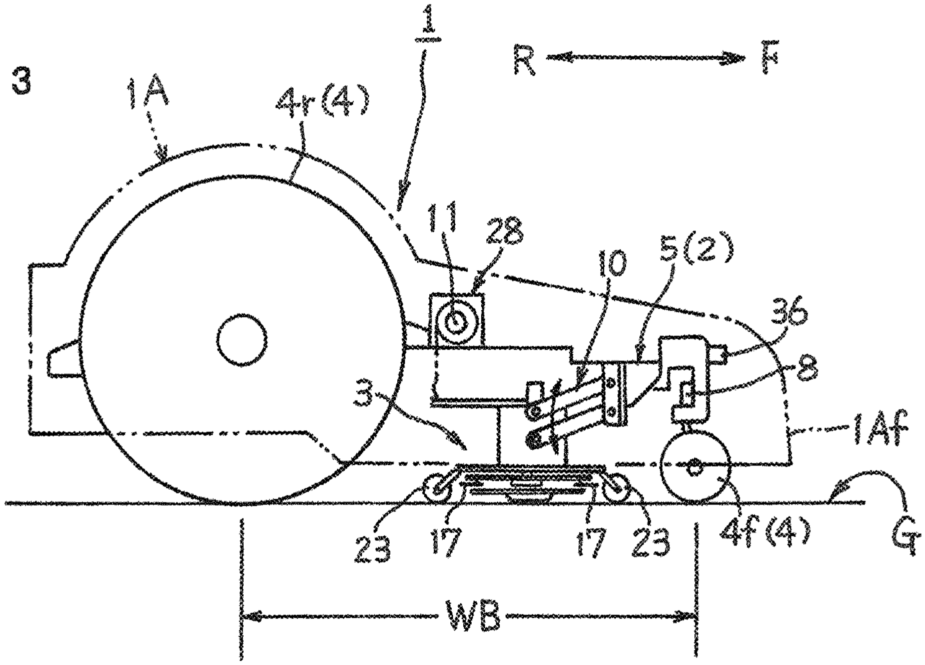
FIG. 3 is a side view of the lawn mower of FIG. 1.

As illustrated in FIG. 3, a lower edge of at least a front part 1Af of the machine body cover 1A is in proximity to a ground surface G. The front part 1Af of the machine body cover 1A inhibits foreign matter such as a branch or dust on the ground surface G or a branch extending laterally from entering the lawn mowing work units 3. As a result, the lawn mowing work units 3 can be protected from foreign matter.

As illustrated in FIG. 3, the lawn mowing work units 3 are mounted so that their height in an up-and-down direction can be adjusted with respect to the machine body frame 5. In the illustrated example, each of the lawn mowing work units 3 is coupled to the machine body frame 5 through intermediation of pivotable parallel links 10 so as to be movable upward and downward. Thus, each of the lawn mowing work units 3 is movable upward and downward while maintaining a horizontal state. All the lawn mowing work units 3 are coupled to a relay shaft 11. When the relay shaft 11 is pivoted in both of a forward direction and a reverse direction, all the lawn mowing work units 3 are moved vertically at the same time. A height of the lawn mowing work units 3 in the up-and-down direction is appropriately adjusted and set in accordance with a lawn mowing height. Details of a vertical movement mechanism for the lawn mowing work units 3 are described later. In FIG. 3, for simplification of illustration, only the lawn mowing work units 3 on the front side in FIG. 2 are illustrated, and an illustration of the lawn mowing work units 3 on the rear side is omitted.

Figure 4:
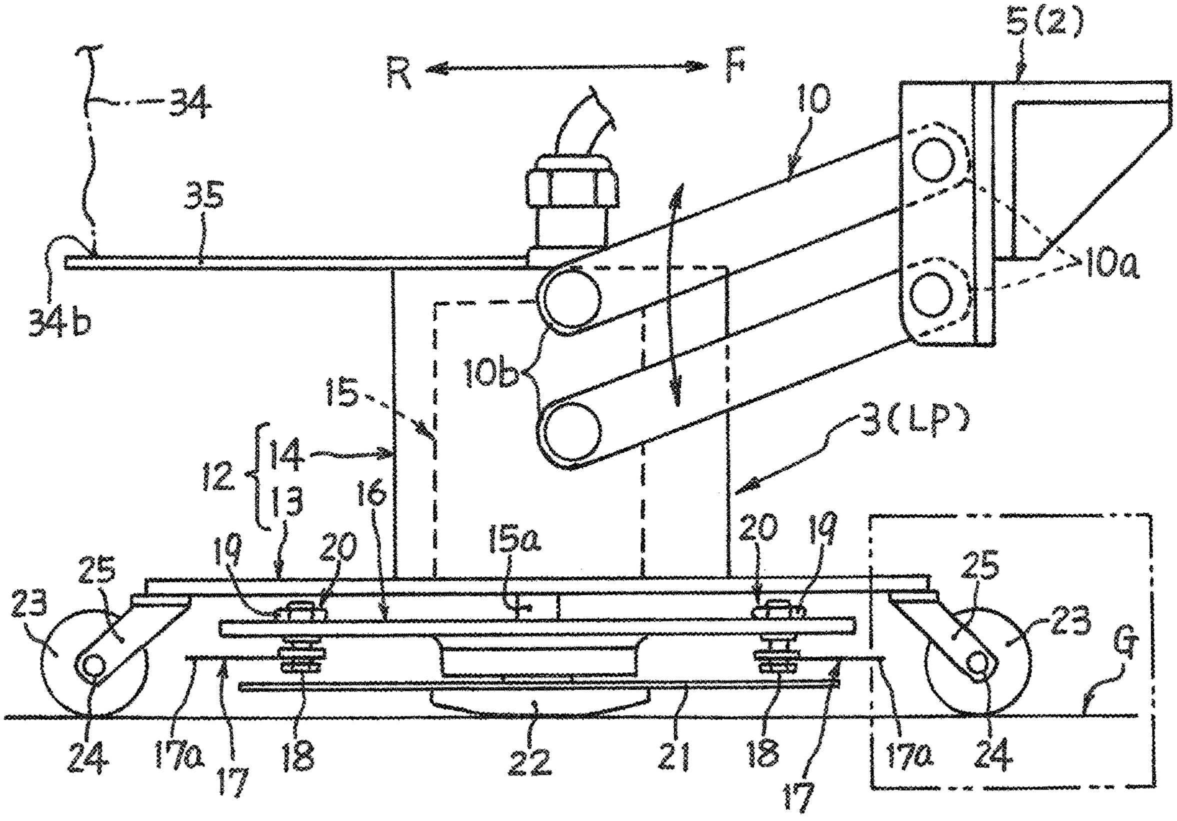
FIG. 4 is an enlarged view of a lawn mowing work unit of FIG. 3.

As illustrated in FIG. 4, each of the lawn mowing work units 3 includes a work-unit housing 12. The work-unit housing 12 includes a horizontal frame 13 having a circular shape and a motor cover 14. The motor cover 14 is firmly fixed onto an upper surface of the horizontal frame 13. An electric cutting-blade drive motor 15 serving as a prime mover is arranged on the horizontal frame 13, and the motor cover 14 is firmly fixed onto the horizontal frame 13 so as to cover the cutting-blade drive motor 15. The cutting-blade drive motor 15 is driven by using the rechargeable battery 7 as a power source. Proximal end portions 10*a* of the parallel links 10 are pivotably supported on the machine body frame 5, and swingable distal end portions 10*b* of the parallel links 10 are pivotably supported on the motor cover 14.

An output shaft 15*a* of the cutting-blade drive motor 15 passes through the horizontal frame 13 to extend directly downward. A blade disc 16 is firmly fixed to a lower end portion of the output shaft 15*a*. The blade disc 16 rotates in a plane of rotation orthogonal to the output shaft 15*a* and is rotationally driven under a state in which the plane of rotation of the blade disc 16 is facing the field.

At least one cutting blade 17 is swingably mounted to a lower surface of an outer peripheral portion of the blade disc 16. The cutting blade 17 is removably mounted to the blade disc 16 with use of an appropriate mounting member 20 so as to be swingable in a horizontal plane. The mounting member 20 includes, for example, a bolt 18 such as a stepped bolt and a nut 19. Although the number of cutting blades is not limited, it is preferred that a plurality of cutting blades be provided to the blade disc 16 at equal angular intervals.

A protective disc 21 having a thin plate-like shape that protects the cutting blade 17 from, for example, collision against the ground surface G is provided below the blade disc 16 so as to face the ground surface G. The protective disc 21 is disposed concentrically with the blade disc 16, and is rotatable independently of the blade disc 16. A diameter of the protective disc 21 is smaller than a diameter of a rotation area defined by the cutting blade 17 when the blade disc 16 is rotated. Lawn mowing work is substantially performed by a blade portion 17*a* of the cutting blade 17. The blade portion 17*a* is located on a radially outer side of the protective disc 21. A holding member 22 that supports the protective disc 21 is firmly fixed at a center of a lower surface of the protective disc 21. The holding member 22 also functions as a ground-contact member to be brought into sliding contact with the ground surface G at the time of low lawn mowing work. However, the holding member 22 is not necessarily required to be in contact with the ground surface at the time of low lawn mowing work.

The cutting blade 17 is pointed in a radial direction of the blade disc 16 by centrifugal force generated through the rotation of the blade disc 16 and protrudes outward beyond the blade disc 16. This protruding orientation illustrated in FIG. 4 corresponds to a lawn mowing orientation of the cutting blade 17. During the lawn mowing work, the cutting blade 17 constantly moves within a micro-angular range under resistance of grass and the centrifugal force generated through the rotation of the blade disc 16. Further, when the cutting blade 17 gets high resistance during the work, the cutting blade 17 is retracted in a direction opposite to a rotating direction of the blade disc 16 so as to avoid the resistance. When the resistance is lost, the cutting blade 17 is returned to an initial lawn mowing orientation by the centrifugal force generated through the rotation of the blade disc 16.

The above-mentioned structure of the cutting blade 17 is merely an example. As another simple example, an elongated rectangular cutting blade or a circular cutting blade may be firmly fixed to the output shaft 15*a* of the cutting-blade drive motor 15 at a central portion of the cutting blade so as to be rotated in a horizontal plane.

Each of the lawn mowing work units 3 includes at least one ground-contact member 23 and is located together with the ground-contact member 23 inside the machine body cover 1A. With this configuration, obstacles such as a branch on the ground surface or a branch extending laterally from, for example, a hedge can be prevented from entering the machine body cover 1A and coming into contact with the lawn mowing work units 3 or the ground-contact member 23. When the ground-contact member 23 is in contact with the ground surface G as illustrated in FIG. 4, each of the lawn mowing work units 3 is located at a low lawn mowing work height position LP. When the lawn mowing work units 3 are located at the low lawn mowing work height position LP, the cutting blade 17 is held at a low height (for example, from 10 mm to 20 mm) above the ground surface, which is suitable for low lawn mowing work. When the lawn mowing work units 3 are located at the low lawn mowing work height position LP, each of the lawn mowing work units 3 is moved upward and downward independently of both of the movable machine body 2 and the other lawn mowing work units 3 so as to adapt to the unevenness of the ground surface G.

Figure 8A:
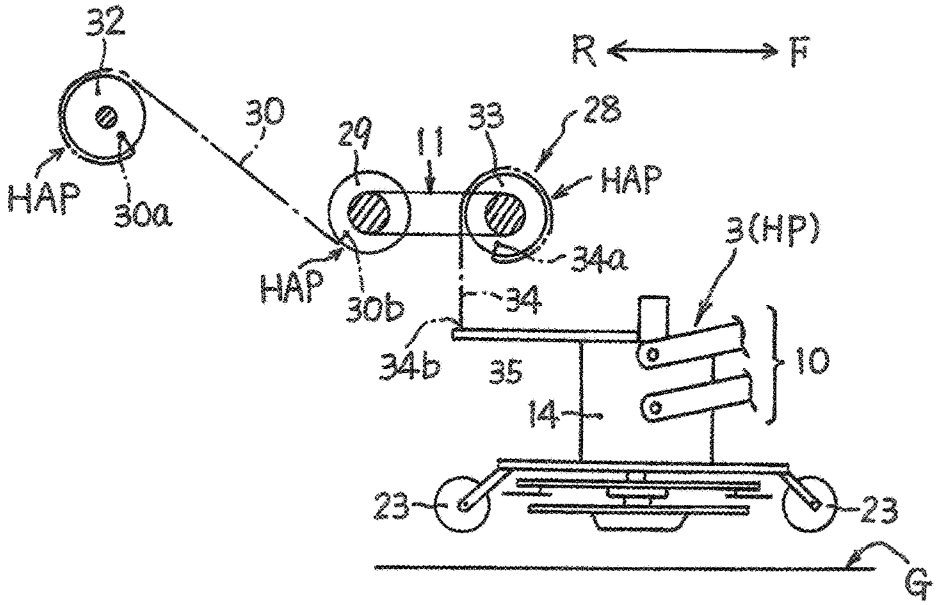
FIG. 8A is a view for illustrating a high lawn mowing work mode and FIG. 8B is a view for illustrating a low lawn mowing work mode.

Meanwhile, when the ground-contact member 23 is separate from the ground surface G and the lawn mowing work units 3 are in midair, the lawn mowing work units 3 are located at a high lawn mowing work height position HP (see FIG. 8A). A plurality of different height-level positions may be set as the high lawn mowing work height position HP. In this case, all the thus set height-level positions are collectively referred to as the high lawn mowing work height positions HP in terms of contrast from the low lawn mowing work height position LP.

The ground-contact member 23 illustrated in FIG. 4 is a rolling-type (for example, wheel-type, roller-type, or caster-type) ground-contact member, which is to be brought into rolling contact with the ground surface G. The rolling-type ground-contact member 23 has low friction against the ground surface G. Thus, the ground-contact member 23 is less liable to become an obstacle to a thrust force for the movable machine body 2. The ground-contact member 23 is supported by the horizontal frame 13 of the work-unit housing 12 through intermediation of an arm 25 having a bearing portion 24. The ground-contact member 23 is disposed on the front side F in the traveling direction of the movable machine body 2 with respect to at least a work range of the cutting blade 17 (rotation area defined by the cutting blade 17 when the blade disc 16 is rotated). With the configuration described above, when the ground surface G has unevenness on the front side F of the work range of the cutting blade 17, each of the lawn mowing work units 3 is moved upward and downward while adapting to the unevenness of the ground surface G. Thus, the cutting blade 17 is automatically prevented from striking the ground surface G in an unmanned manner.

Figure 5:
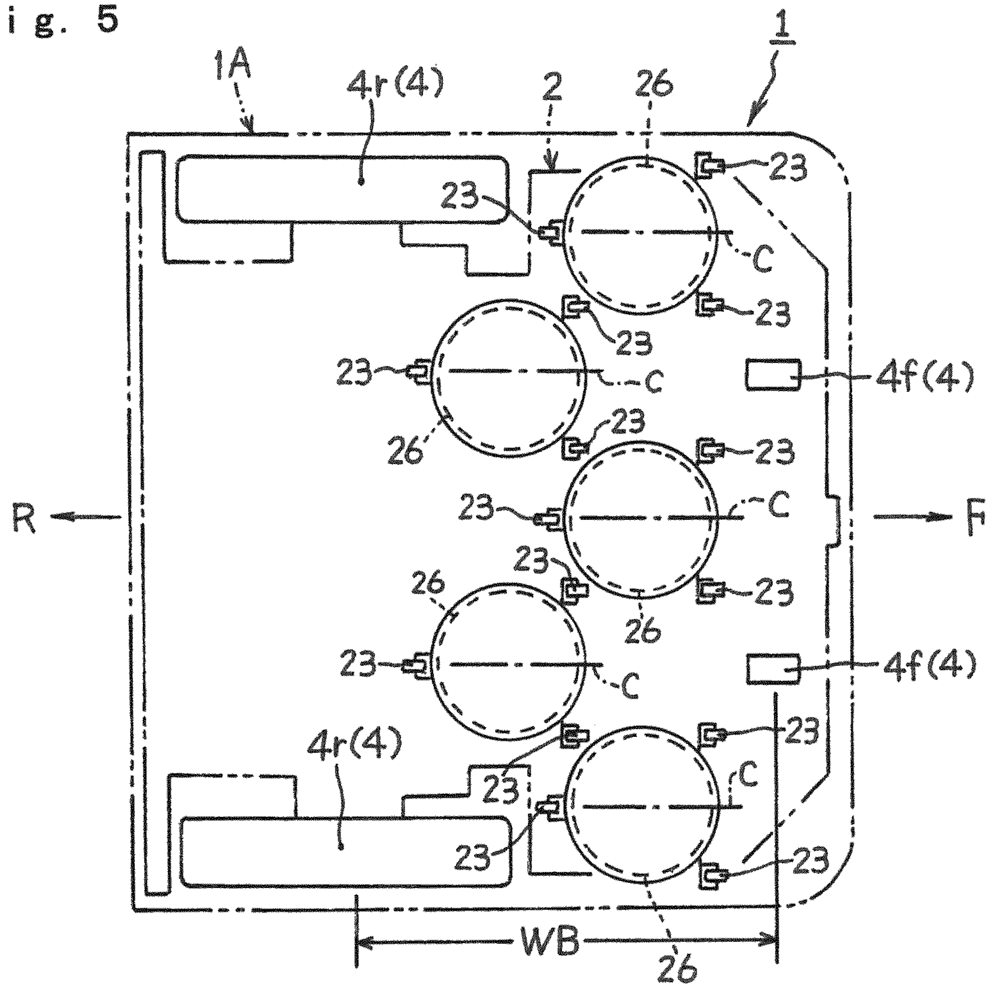
FIG. 5 is a plan view for illustrating only a main part of FIG. 2.

As illustrated in FIG. 5, the ground-contact members 23 are located within an area WB between the front wheels 4*f* and the rear wheels 4*r*, which are the moving devices of the movable machine body 2, in the front-and-rear direction. The positions at which the ground-contact members 23 are disposed are specifically determined as described above for the following reason. Some lawn mowing work requires accuracy for a lawn mowing height in accordance with visual quality to be achieved or a purpose of mowing. Specifically, low lawn mowing work for mowing a lawn to a significantly short consistent height may be required not only for improvement of a view of a ball game ground such as a golf course or a soccer field after lawn mowing but also for other purposes, for example, for allowing easier finding of balls in the field and for allowing smoother rolling of balls. For the low lawn mowing work, the lawn mowing work unit 3 is required to be set at a low height in the up-and-down direction with respect to the movable machine body 2 so that the cutting blade 17 of the lawn mowing work unit 3 is located closer to the ground surface G.

When the low lawn mowing work is performed, however, the lawn mowing work unit 3 is close to the ground surface G. Thus, when the ground surface G has fine unevenness, the cutting blade 17 of the lawn mowing work unit 3 may strike a bump after the front wheel 4*f* of the movable machine body 2 passes over the bump. When the cutting blade 17 strikes the ground surface G, the cutting blade 17 or the lawn may be damaged. Thus, the collision is not preferred for the lawn mower 1 and in view of maintenance of visual quality of the lawn or conservation of roots of grass. In particular, a working condition of the unmanned self-driving robotic lawn mower 1 is not supposed to be constantly monitored by a human. Thus, it is highly important to autonomously avoid the contact of the cutting blade 17 with a bump on the ground surface G.

Thus, in this embodiment, as illustrated in FIG. 5, the ground-contact members 23 are disposed so as to be located within the area WB between the front wheels 4*f* and the rear wheels 4*r* in the front-and-rear direction, which are the moving devices of the movable machine body 2. Thus, even when a slope or unevenness of the ground surface G is present under the area between the front wheels 4*f* and the rear wheels 4*r* during the low lawn mowing work, a desired mowing height is maintained while the ground-contact members 23 are adapted to the slope or unevenness. At the same time, the cutting blade 17 is prevented from striking the ground surface G.

Although the arrangement of the ground-contact members 23 is not limited, two ground-contact members 23 on the front side are arranged on the right side and the left side in front of a work range 26 of the cutting blade 17, and one ground-contact member 23 on the rear side is arranged at a central position behind the work range 26 of the cutting blade 17 for each of the lawn mowing work units 3 in the example illustrated in FIG. 5. The ground-contact members 23 on the front side are arranged at positions offset from a center line C of the work range 26 of the cutting blade 17, which extends in the front-and-rear direction. Thus, the ground-contact members 23 are less liable to obstruct the lawn mowing work. Further, the ground-contact members 23 are disposed on the right side and the left side in front of (on the front side F of) the work range 26 of the cutting blade 17. Thus, even when a bump on the ground surface G is present on any of the right side and the left side in front of (on the front side F of) the cutting blade 17, the collision between the cutting blade 17 and the ground surface G can be prevented.

Figure 6:
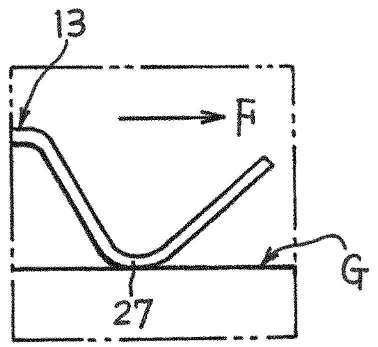
FIG. 6 is a side view for illustrating a modification example of a portion indicated by the arrow E in FIG. 4.

As a modification example of the ground-contact member 23, as illustrated in FIG. 6, a ground-contact member 27 to be brought into sliding contact with the ground surface G may be used. This modification example is similar to, for example, a ground-contact member of a sleigh. The modification example has superiority over the rolling type ground-contact member 23. Specifically, when the ground-contact member is of rolling type, grass may be caught by the bearing portion 24 (see FIG. 4) that allows rolling, resulting in inhibition of smooth rolling of the ground-contact member 23. In contrast, when the sliding-contact type ground-contact member 27 is used, the problem described above does not occur.

Figure 7:
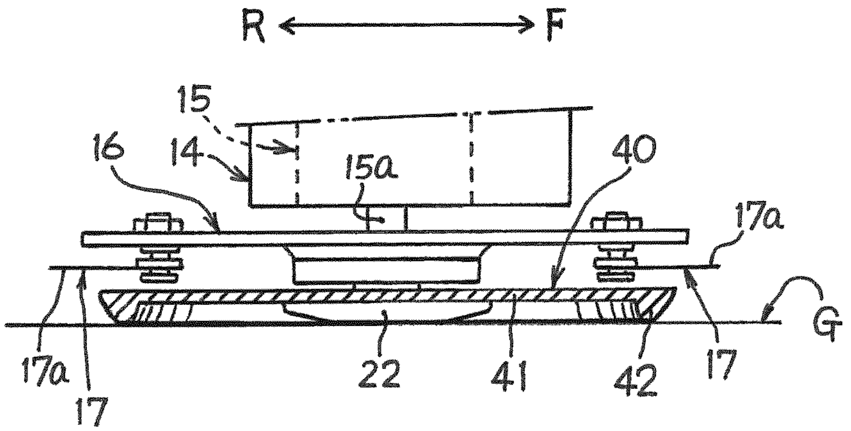
FIG. 7 is a side view for illustrating a modification example of a part (ground-contact member) of FIG. 4, in which a protective disc serving as the ground-contact member is illustrated in cross section.

As another modification example of the ground-contact member 23, 27, a ground-contact member (protective disc) 40 illustrated in FIG. 7 may be used. The protective disc 40 illustrated in FIG. 7 is a modification example of the protective disc 21 of FIG. 4. The protective disc 40 of FIG. 7 is different from the protective disc 21 of FIG. 4 in that the protective disc 40 has a protruding portion 42 protruding downward from an outer peripheral portion of a circular plate body 41 facing the ground surface G. The protective disc 40 is brought into sliding contact with the ground surface G at the protruding portion 42. Otherwise, the protective disc 40 is similar to the protective disc 21 of FIG. 4. In FIG. 7, as in the case of the holding member of FIG. 4, the holding member 22 is not necessarily required to be brought into contact with the ground surface during the low lawn mowing work.

In the example illustrated in FIG. 7, the downwardly protruding portion 42 being in contact with the ground surface G extends in an annular manner from a lower surface of an outer peripheral portion of the circular plate body 41. In this case, the protruding portion 42 having an annular shape is located concentrically with the output shaft 15*a* of the cutting-blade drive motor 15, which serves as a center of rotation of the cutting blade 17. Although not shown, the protruding portion 42 may be formed intermittently on the outer peripheral portion of the circular plate body 41 as another modification example of the formation of the downwardly protruding portion 42. Further, only one downwardly protruding portion 42 may be formed. When only one downwardly protruding portion 42 is formed or the downwardly protruding portion 42 is formed intermittently, a specific position at which the downwardly protruding portion 42 is formed is only required to be set to an appropriate position on the outer peripheral portion of the plate body 41.

With the protective disc (ground-contact member) 40 having the outer peripheral portion on which the downwardly protruding portion 42 is formed, the ground-contact member 40 is more compact and is formed in a simpler manner than the ground-contact member 23, 27 described above. Thus, the protective disc 40 not only contributes to reduction in cost but also suppresses tangling of grass around the ground-contact member 40. Further, the protective disc 40 illustrated in FIG. 7, which has the downwardly protruding portion 42 extending in an annular manner from the lower surface of the outer peripheral portion of the plate body 41, also has an advantage in that the protruding portion 42 is always located in the vicinity of the cutting blade 17 so that the ground-contact member 40 can deal with unevenness that is present in any direction. When a single downwardly protruding portion 42 is formed or the downwardly protruding portion 42 is intermittently formed on the outer peripheral portion of the plate body 41 having a circular shape, friction against the ground surface G is smaller than friction of the protective disc 40 of FIG. 7 against the ground surface G. Thus, the ground-contact member is less liable to obstruct the thrust force for the movable machine body 2. Thus, a load on a prime mover for the moving devices 4 during traveling can be reduced. Further, an increase in weight of the ground-contact member can also be suppressed.

When a protective disc (ground-contact member) having an outer peripheral portion from which the protruding portion 42 downwardly extends, such as the protective disc 40 of FIG. 7, is used, the ground-contact member 23 of FIG. 4 or the ground-contact member 27 of FIG. 6 is not required to be provided. However, the above-mentioned protective disc may be used in combination with the ground-contact member 23, 27.

Next, with reference to FIG. 2, FIG. 3, and FIGS. 8, an example of an adjustment mechanism 28 (vertically moving mechanism for the lawn mowing work unit) which allows the lawn mowing work unit 3 to be moved upward and downward with respect to the movable machine body 2 is described. In FIGS. 8, there is illustrated a coupling relationship among a drive pulley 32, a drive belt 30, a relay pulley 29, a relay shaft 11, driven pulleys 33, driven belts 34, which form the adjustment mechanism 28, and the lawn mowing work unit 3.

As illustrated in FIG. 2, the relay shaft 11 of the adjustment mechanism 28 is horizontally supported on the movable machine body 2 so as to extend in the right-and-left direction of the movable machine body 2. The relay shaft 11 is arranged between the lawn mowing work units 3 on the front side and the lawn mowing work units 3 on the rear side. The relay pulley 29 is firmly fixed to the relay shaft 11. The relay pulley 29 is coupled through intermediation of the drive belt 30 to the drive pulley 32 for an electric motor 31 for vertical movement serving as a prime mover. The electric motor 31 for vertical movement is mounted onto the movable machine body 2 and is actuated by using the rechargeable battery 7 as a power source as in the case of the electric drive motor 6. The driven pulley 33 is firmly fixed to the relay shaft 11 for each lawn mowing work unit 3.

As illustrated in FIG. 2 and FIG. 3, the adjustment mechanism 28 that allows the lawn mowing work unit 3 to be moved upward and downward is located inside the machine body cover 1A. This arrangement is effective to prevent foreign matter such as a branch on the ground surface or a branch extending laterally from entering the machine body cover 1A so as to enable maintaining a desired mowing height while preventing damage to the adjustment mechanism 28.

As illustrated in FIGS. 8, one end 30*a* of the drive belt 30 is firmly fixed to the drive pulley 32, and another end 30*b* of the drive belt 30 is firmly fixed to the relay pulley 29. The driven pulleys 33 are coupled to the lawn mowing work units 3 through intermediation of the driven belts 34, respectively. One end 34*a* of each of the driven belts 34 is firmly fixed to the driven pulley 33, and another end 34*b* of each of the driven belts 34 is firmly fixed to a corresponding one of the lawn mowing work units 3. The electric motor 31 for vertical movement, the drive pulley 32, the drive belt 30, the relay pulley 29, the relay shaft 11, the driven pulleys 33, and the driven belts 34 form the adjustment mechanism 28 for each of the lawn mowing work units 3.

Similarly to the lawn mowing work unit 3 illustrated in FIG. 3 and FIG. 4, the lawn mowing work unit 3 illustrated in FIG. 8 corresponds to the lawn mowing work unit 3 on the front side illustrated in FIG. 2. As illustrated in FIG. 2, the lawn mowing work unit 3 on the front side is located in front of the relay shaft 11. Thus, an alignment coupling plate 35 extending to the rear side R is firmly fixed to an upper surface of the motor cover 14 of each of the lawn mowing work units 3 on the front side. The another end 34*b* of the driven belt 34 is firmly fixed to a rear end of the alignment coupling plate 35. Meanwhile, for the lawn mowing work units 3 on the rear side illustrated in FIG. 2, an alignment coupling plate (not shown) extending to the front side is firmly fixed to the upper surface of the motor cover 14, and the another end 34*b* of the driven belt 34 is firmly fixed to a front end of the alignment coupling plate.

The adjustment mechanism 28 has a plurality of modes for adjustment of the mowing height. When the adjustment mechanism 28 is in a low lawn mowing work mode corresponding to at least one of the modes, the ground-contact members 23 are constantly in contact with the ground surface G. Specifically, the drive pulley 32 for the electric motor 31 for vertical movement (see FIG. 2) is pivotable in both of a forward direction and a reverse direction between, for example, a predetermined high lawn mowing work angular position HAP illustrated in FIG. 8A and a low lawn mowing work angular position LAP illustrated in FIG. 8B. The drive pulley 32 can be stopped steplessly or in a step-by-step manner between the angular position HAP and the angular position LAP. The drive pulley 32 is pivoted and stopped by controlling the electric motor 31 for vertical movement with use of the controller 9 (see FIG. 2 for both of the electric motor 31 and the controller 9).

When the drive pulley 32 is stopped at the high lawn mowing work angular position HAP, the relay pulley 29 and all the driven pulleys 33 are also stopped at the predetermined high lawn mowing work angular position HAP of FIG. 8A under tension of the drive belt 30. Further, all the lawn mowing work units 3 are brought up into the air and held at the high lawn mowing work position HP under tension of the driven belts 34 (high lawn mowing work mode). At this time, a rotational force in a counterclockwise direction acts on the relay shaft 11 under own weight of all the lawn mowing work units 3. When the rotational force and a stopping force for the drive pulley 32 are balanced out, the rotation of the relay shaft 11 is blocked.

Figure 8B:
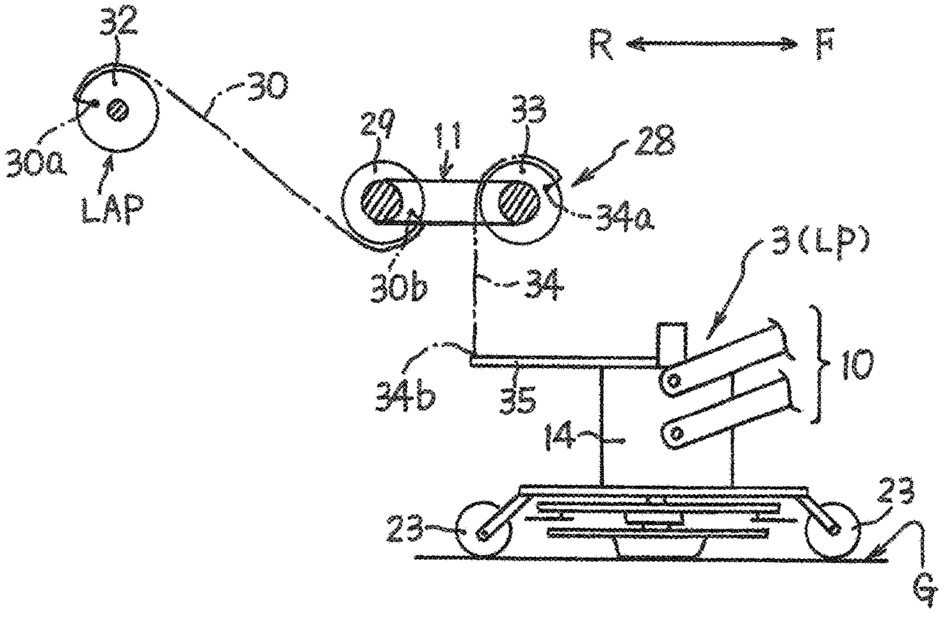

When the electric motor 31 for vertical movement is actuated in a state of FIG. 8A to pivot the drive pulley 32 in a clockwise direction to the predetermined low lawn mowing work angular position LAP of FIG. 8B, the drive belt 30 is released by the amount corresponding to a pivot angle. Thus, the relay pulley 11 and all the driven pulleys 33 are pivoted in the counterclockwise direction by the rotational force acting on the relay shaft 11 in the counterclockwise direction. As a result, all the lawn mowing work units 3 are moved downward under their own weight, and the lawn mowing work units 3 reach the low lawn mowing work height position LP at which the ground-contact members 23 are brought into contact with the ground surface G (low lawn mowing work mode). At this time, a range of the pivot angle of the drive pulley 32 is set in advance so that the drive belt 30 and the driven belts 34 have a predetermined amount of looseness. The looseness of the drive belt 30 and the driven belts 34 allows each of the lawn mowing work units 3 to adapt to a recessed portion in the ground surface G independently of both of the movable machine body 2 and the other lawn mowing work units 3. Further, it is apparent that, when the lawn mowing work unit is located at the low lawn mowing work height position LP illustrated in FIG. 8B, each of the lawn mowing work units 3 can also adapt to a bump on the ground surface G independently of both of the movable machine body 2 and the other lawn mowing work units 3.

The following adjustment mechanism may be used as a modification example of the adjustment mechanism 28. Specifically, the drive pulley 32, the drive belt 30, the relay pulley 29, and the relay shaft 11 are eliminated from the configuration described above. In place of the relay shaft 11, a drive shaft that is pivotable in both of the forward direction and the reverse direction and is stoppable within a predetermined angular range is arranged horizontally. The drive shaft is rotationally driven by the electric motor 31 for vertical movement. The driven pulleys 33, which correspond to the lawn mowing work units 3, respectively, are firmly fixed to the drive shaft. As in the case of the adjustment mechanism of FIG. 4, the another end 34*b* of the driven belt 34 having the one end 34*a* firmly fixed to each of the driven pulleys 33 is connected to a corresponding one of the lawn mowing work units 3. In this case, when the drive shaft is rotationally driven by the electric motor 31 for vertical movement, the lawn mowing work units 3 can be displaced to the high lawn mowing work height position HP and the low lawn mowing work height position LP. When the lawn mowing work units 3 are located at the low lawn mowing work height position LP, a range of a pivot angle of the drive shaft is set in advance so that the driven belts 34 have looseness. In this manner, the lawn mowing work units 3 can be moved upward and downward so as to adapt to unevenness of the ground surface G independently of both of the movable machine body 2 and the other lawn mowing work units 3. Further, the arrangement of the adjustment mechanisms 28 inside the machine body cover 1A prevents foreign matter such as a branch from entering the machine body cover 1A to thereby enable preventing damage to the adjustment mechanisms 28.

As another example of the adjustment mechanism 28, a mechanism for driving the parallel links 10 upward may be used. In this case, when the adjustment mechanism 28 is in the low lawn mowing work mode, downward movement of the parallel links 10 is limited with a margin. As a result, the lawn mowing work units 3 can adapt to a recessed portion in the ground surface G. Even in this example, the adjustment mechanisms 28 are arranged inside the machine body cover 1A. Thus, foreign matter such as a branch does not enter the machine body cover 1A from an outside, and hence damage to the adjustment mechanisms 28 can be prevented.

As a modification example, as illustrated in FIG. 2 and FIG. 3, a detection device 36 for detecting unevenness of the ground surface G may be disposed on the movable machine body 2. In this case, the controller 9 of FIG. 2 is configured to reduce a speed of the movable machine body 2 after acquiring information regarding the unevenness of the ground surface G, which has been detected by the detection device 36. Thus, the lawn mowing work units 3 can more precisely adapt to the unevenness of the ground surface G. In particular, in order to detect the unevenness of the ground surface G, which is present on the front side in the traveling direction, it is preferred that the detection device 36 be disposed on the movable machine body 2 so as to be located on the front side in the traveling direction. With the configuration described above, the detection device 36 can detect unevenness of the ground surface G before the lawn mowing work units 3 reach the unevenness, and the controller 9 can reduce the moving speed of the movable machine body 2 to a moving speed that allows the ground-contact members 23 to be always reliably brought into contact with the ground surface G. More preferably, the detection device 36 is able to acquire ground-surface information over a distance of at least 5 meters from a front end portion of the movable machine body 2. This specific distance is determined in consideration of application of a brake.

Further, a plurality of detection devices 36 may be provided. In this case, pieces of information acquired from the detection devices 36 are combined and output as single information to the controller 9 to thereby enable enhancing detection accuracy. Examples of the detection device 36 include a tilt sensor, an infrared sensor, a photoelectric sensor, a millimeter-wave radar sensor, other sensors, and a camera. When the plurality of detection devices 36 are provided, a detection error can be reduced by using a plurality of detection devices 36 of the same kind. Further, when a plurality of different kinds of detection devices 36 are used, detection accuracy can be enhanced regardless of, for example, an environment by setting the detection devices 36 so that, under a detection environment in which one detection device 36 is not capable of performing detection with high accuracy, another detection device 36 functions supplementarily to or dominantly over the one detection device 36. For example, a camera can detect the unevenness of the ground surface G over a broad range. However, the camera has low detection ability for a ground surface with a shade. In this case, when a combination of broad-range detection means such as a camera and short-range detection means such as an infrared sensor is used, features of both of the means can be maximumly utilized.

Further, the information regarding the unevenness of the ground surface G may be acquired without the detection device 36 provided to the movable machine body 2. The controller 9 acquires information by comparing, for example, topographical information and positional information of a field, which are stored in advance, and positional information of the lawn mower 1 with each other and then estimating a position of the unevenness of the ground surface G. The detection device 36 that detects the unevenness of the ground surface G for each time may fail to perform detection due to a failure of the detection device 36 or may have a time lag in outputting the information detected by the detection device 36 to the controller 9. With the above-mentioned configuration, the information regarding the unevenness of the ground surface G can be reliably acquired without being affected by a state and accuracy of the detection device 36 or a time lag. It is apparent that at least one of the topographical information and the positional information associated with the topographical information may be used together with a method of detecting the unevenness of the ground surface for each time in order to enhance the detection accuracy. This configuration allows the topographical information and the positional information of the field, which are stored in advance, to be corrected. Thus, more precise ground-surface information can be constructed.

At least one of the topographical information and the positional information of the field may be stored in a memory of the lawn mower 1. Further, the information may be stored in a server so that the lawn mower 1 receives the information via the server. In this manner, costs can be reduced by reducing memory capacity mounted on the lawn mower 1 or an unnecessary amount of memory capacity is allowed to be used by another function. One example of the positional information of the lawn mower 1 includes information acquired from a global navigation satellite system (GNSS) sensor, which receives a radio signal emitted from a satellite in a GNSS such as a GPS.

The embodiments of this disclosure have been described in detail. However, a specific configuration is not limited to those of the embodiments described above. For example, changes in design without departing from the scope of this disclosure are encompassed in this disclosure. Further, technologies in the above-mentioned embodiments described above may be used in combination as long as there is no particular contradiction or problem in, for example, purpose and configuration.

The invention claimed is:

1. An autonomous lawn mower, comprising:

a movable machine body being movable through unmanned driving with moving devices;

at least one lawn mowing work unit mounted on the movable machine body; and a machine body cover that covers an upper surface and a peripheral surface of the movable machine body, wherein the at least one lawn mowing work unit includes:

a cutting blade;

a prime mover configured to drive the cutting blade;

at least one ground-contact member, which is located within an area between the moving devices in a front-and-rear direction, and is configured to prevent contact of the cutting blade with a ground surface; and an adjustment mechanism configured to allow the lawn mowing work unit to be moved upward and downward with respect to the movable machine body, and wherein the ground-contact member and the cutting blade are located inside the machine body cover, wherein when the adjustment mechanism is in at least one of a plurality of modes for adjusting a mowing height, the ground-contact member is constantly in contact with the ground surface.

2. The autonomous lawn mower according to claim 1, wherein at least one of the plurality of modes of the adjustment mechanism is a low lawn mowing work mode.

* * * * *